United States Patent [19]

Livesay et al.

[11] 4,288,172
[45] Sep. 8, 1981

[54] KEEPER ASSEMBLY

[75] Inventors: Richard E. Livesay; Paul L. Wright, both of Peoria, Ill.

[73] Assignee: Caterpillar Tractor Co., Peoria, Ill.

[21] Appl. No.: 12,994

[22] Filed: Feb. 21, 1979

Related U.S. Application Data

[63] Continuation-in-part of Ser. No. 889,702, Mar. 24, 1978, Pat. No. 4,182,578.

[51] Int. Cl.³ .............................................. F16B 21/16
[52] U.S. Cl. .................................. 403/317; 403/326; 403/360
[58] Field of Search ............... 403/DIG. 7, 360, 316, 403/261, 326, 317; 85/8.8, 8.9; 74/251 R, 254, 255 R; 152/410

[56] References Cited

U.S. PATENT DOCUMENTS 2,897,022  7/1959  Marola ............................... 85/8.8 X
2,920,673  1/1960  Boldt et al. ....................... 152/410 X
3,099,346  7/1963  Maas ................................. 74/254 X

FOREIGN PATENT DOCUMENTS 1405307  5/1965  France ............................. 403/247
176109  2/1922  United Kingdom ............... 152/410

Primary Examiner—Andrew V. Kundrat
Attorney, Agent, or Firm—Charles E. Lanchantin, Jr.

[57] ABSTRACT

A keeper assembly (10) includes an arcuate keeper member (46) having a pair of planar side surfaces (56,58) and a preselected U-shaped configuration in cross section adapted to be seated in a correspondingly profiled annular groove (64) in a first member (16) having a central axis (18). A second member (32) having a force transmitting surface (76) transverse to the axis (18) loads the keeper member (46) and the force is transferred into the first member (16). The keeper assembly (10) can be used in an endless chain joint (14).

4 Claims, 7 Drawing Figures

KEEPER ASSEMBLY

CROSS-REFERENCE TO RELATED APPLICATION

This application is a continuation-in-part of Application Ser. No. 889,702, filed Mar. 24, 1978, now U.S. Pat. No. 4,182,578.

TECHNICAL FIELD

The present invention relates to a keeper assembly wherein a replaceable keeper member provides a shoulder which functions to secure a first member against axial displacement with respect to a second member.

BACKGROUND ART

It is well known to utilize a C-shaped retaining ring capable of being spread and inserted over the end of a shaft and released into a groove around the shaft. The dimensions of both the retaining ring and the groove in the shaft are dependent upon the allowable working stresses to which the retaining ring is subjected, and it is essential that during spreading of the ring during installation that the stresses thereon do not exceed the elastic limit.

Retaining rings having either a rectangular or circular cross sectional shape are conventionally used by the industry to prevent axial displacement of a bushing, for example, on a cylindrical shaft. Unfortunately, the rings with a circular cross section are seated in relatively shallow semicircular grooves so that the amount of force that can be resisted is lowered substantially. Furthermore, the leading sharp internal edge of the bushing has a tendency to dig into these round rings so that excess axial movement of the associated members occurs or excess deformation of the ring can result in a failure thereof.

On the other hand, those retaining rings or keeper members that have a rectangular cross section provide a more positive shoulder in a plane transverse to the central axis thereof as may be noted by reference to FIG. 5. In the usual construction illustrated by FIG. 5, axial loads are transmitted through the retaining ring to the opposite face of the groove. The root corners of the groove are relatively sharp in order to relatively closely receive the sharp-edged rectangularly sectioned retaining ring. Accordingly, when the forces upon the opposite shoulder or wall of the groove exceed a particular value the stresses rise at the relatively sharp-edged base thereof to the point of failure of the retaining system. Particularly, when it is a necessity that the groove be positioned axially close to the end of the shaft because of space limitations or the like, it has been found that the failure under high loads is in the form of a shear failure of the end of the pin. As shown in FIG. 5, the shear failure is generally along a converging cone outwardly from the axially outer base edge of the groove, as indicated.

In view of the above, it would be advantageous to provide a keeper assembly better able to secure a first member against axial displacement with respect to a second member, and positively able to transmit higher loads without failure.

The present invention is directed to overcoming one or more of the problems as set forth above.

DISCLOSURE OF INVENTION

In accordance with one aspect of the present invention a keeper member having a pair of planar side surfaces and a preselected U-shaped configuration in cross section is seated in an annular groove of corresponding profile in a first member for transferring force from a second member to the first member.

In another aspect of the invention a plurality of arcuate keeper segments are seated in an annular groove of a first member adjacent the end thereof, with the groove and keeper segments having a U-shaped cross section with planar side surfaces to more effectively transfer forces from a second member into the first member.

More specifically, the keeper assembly of the present invention finds particular utility in the environment of an endless track chain joint in order to retain the track links on the track pins.

BEST MODE FOR CARRYING OUT THE INVENTION

Figure 1:
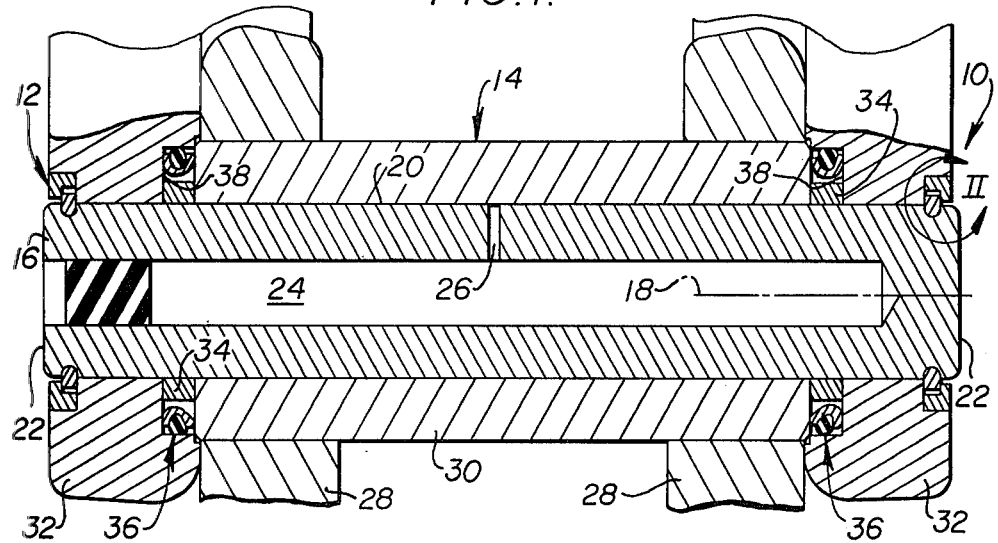
FIG. 1 is a diagrammatic, fragmentary, cross sectional view of a track chain joint illustrating one embodiment of a pair of keeper assemblies constructed in accordance with the present invention.

In the embodiment of the invention illustrated in FIG. 1, a first keeper assembly 10 and a second identical keeper assembly 12 are shown in connection with the opposite sides of a representative one of a plurality of interconnected endless track chain joints 14. Each of the joints 14 includes a track pin 16 having a central axis 18, a cylindrical outer surface 20 and a pair of opposite end surfaces 22. A lubricant reservoir 24 is formed within the pin and one or more radial passages 26 communicate fluid in the reservoir to the outer surface centrally of the pin. A first pair of track links 28 is mounted as by a press fit on the opposite ends of a hollow cylindrical track bushing 30, and a second pair of track links 32 is mounted as by a press fit on the opposite ends of the track pin. Thus, the bushing and the inner track links 28 are free to rotate centrally on the track pin about the axis 18, while the outer track links 32 are relatively firmly secured to the track pin. A pair of spacer rings 34 serve to transmit axial loads between the bushing and the outer track links and to define the minimum spacing therebetween for axial dimensional control of a pair of end face seal ring assemblies 36 circumscribing the spacer rings and disposed in a respective one of a pair of counterbores 38 in the outer track links. The aforementioned track chain joint construction, including the spacer rings and the seal ring assemblies, for example, but excluding the keeper assemblies 10 and 12, is generally well known in the art.

Figure 3:
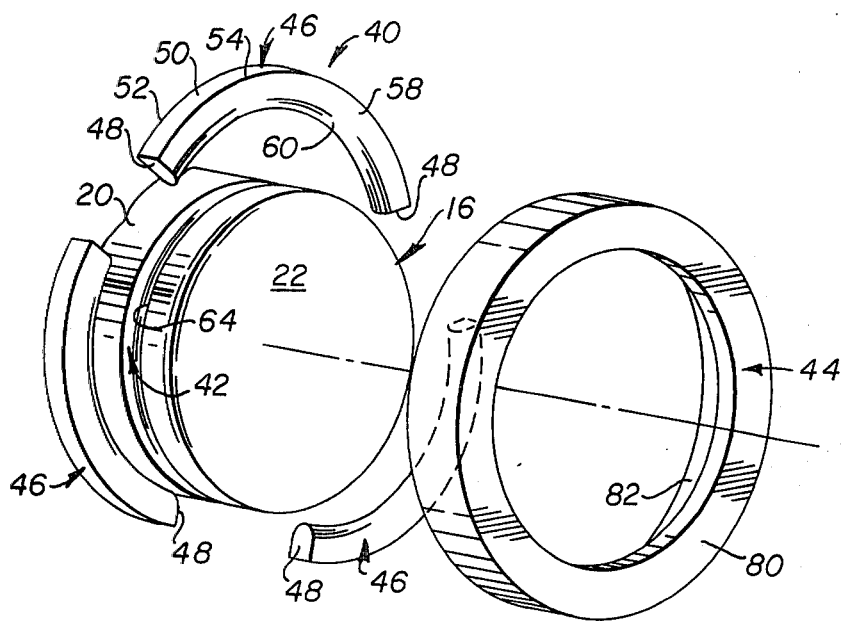
FIG. 3 is a fragmentary, diagrammatic, exploded perspective end view of one of the keeper assemblies illustrated in FIGS. 1 and 2.
Figure 2:
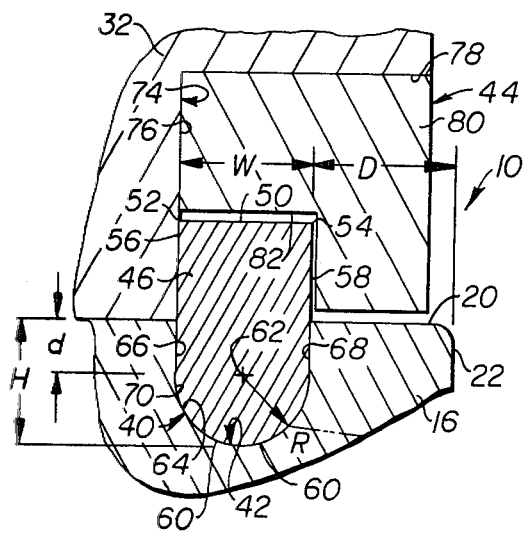
FIG. 2 is a greatly enlarged fragmentary cross sectional view of the upper right hand keeper assembly illustrated in FIG. 1 to better illustrate details of construction thereof.

Referring now to the construction of the first keeper assembly 10, as best illustrated in FIGS. 2 and 3, it may be noted that solid metal keeper means 40 of preselected construction is included and received in groove means 42 in the track pin 16, and retaining means 44 is provided for radially containing the keeper means in place in the groove means.

The keeper means 40 preferably includes a plurality of identical arcuately shaped keeper segments or members 46 of preselected construction. In the embodiment illustrated, three arcuate keeper segments are utilized which are substantially adjacent segments of an interrupted annular ring. Each of these keeper segments has a pair of opposite end surfaces 48 as shown in FIG. 3, and a radially outer cylindrical surface portion 50 spanning substantially between the end surfaces and having a pair of axially opposite edges 52 and 54 as shown best in FIG. 2. Advantageously, a planar side surface 56 and a planar side surface 58 extend radially inwardly from the respective edges 52 and 54 of the keeper segment, and a convex curved surface 60 connects the opposite side surfaces 56,58. The planar side surfaces also extend substantially between the end surfaces 48 and are located in use in planes transverse to the central axis 18. In operation, the axially inner planar side surface 56 axially receives the force from the track link 32.

Both the axially outer planar side surface 58 and the curved surface 60 transfer force from the track link 32 obliquely into the track pin 16. The planar side surface 58 extends radially inwardly in substantially parallel relation to the opposite planar side surface 56 and defines therewith a preselected axial width "W" of the keeper segment 46 as indicated in FIG. 2. These side surfaces extend in use radially into the groove means 42 a common preselected depth "d" from the outer surface 20, and the convex curved surface 60 is preferably defined by revolving a semicircular arc located on a plane through the central axis 18 about the axis and substantially between the end surfaces 48. Such semicircular arc is tangent to the planar side surfaces 56,58, has a preselected radius "R" from a center point 62 located in use at the preselected depth "d". Thus, each of the keeper segments 46 has a preselected U-shaped configuration in cross section.

In the embodiment of FIGS. 2 and 3, the groove means 42 is an annular groove 64 opening radially outwardly on the surface 20 of the pin 16 and extending continuously peripherally around the pin. Preferably, the groove 64 is disposed a preselected axial distance "D" at least as great as the axial width "W" from the exterior end surface 22 as indicated in FIG. 2. Moreover, the groove in the pin is defined by a pair of planar side walls 66 and 68 and a concave curved base surface or root 70 connected to both side walls and defining a maximum radial groove depth "H" in section about equal to the width "W" as shown. In a manner compatible with the cross sectional configuration of the keeper segments 46, the planar side walls 66,68 are located in planes transverse to the axis 18 and the concave root 70 is preferably defined by revolving a semicircular arc having substantially the same center point 62 about the central axis. Thus, the annular groove 64 has a preselected U-shaped configuration in cross section as taken by a cutting plane through the axis, such cross section being slightly larger than the corresponding sections of the keeper segments 46 to provide a preselected clearance therebetween.

Preferably, for best results, the preselected radial depth "d" generally representing the radial width of the groove side walls 66,68 should be at least 35% of the preselected radius "R". Moreover, in order to minimize the total depth of the groove H and the detrimental influence thereof on the cross sectional strength of the track pin 16 the depth "d" should preferably not be greater than about the preselected radius "R".

It is therefore apparent that the keeper segments 46 and the annular groove 64 have mating surfaces substantially concentrically arranged with respect to the central axis 18, the mating surfaces defining in cross sectional configuration two axially spaced pairs of juxtaposed straight lines transversely oriented with respect to the central axis 18 and a pair of juxtaposed semicircular arcs each connected to a respective one of each of the pairs of straight lines.

Since the embodiment of FIGS. 1, 2 and 3 has three arcuate keeper segments 46 for ease of insertion into the annular groove 64 of the pin 16, the retaining means 44 is utilized to contain the keeper segments. For this purpose each of the track links 32 has an axially outwardly facing cylindrical counterbore 74 defined by an annular end wall or axial force transmitting surface 76 and a cylindrical internal surface 78. The retaining means 44 desirably includes an annular retaining cap 80 having an axially inwardly facing cylindrical counterbore 82, so that when the retaining cap is releasably press fitted fully into the counterbore 74 of the track link the counterbore 82 contains and otherwise restricts movement of the keeper segments 46 radially outwardly from the groove.

Industrial Applicability

A series of experimental tests were run in a laboratory press on the maximum axial retention load and mode of failure of solid metal keeper assemblies of various cross sectional configurations disposed in mating grooves, and with the grooves located a preselected distance "D" from the end surface of the pins. The results were as follows:

1. Test of FIG. 5 Keeper Assembly of the usual type: Load at failure—43,500 pounds. This first comparison keeper assembly failed by the shaft end land popping off abruptly substantially as indicated in broken lines.
2. Test of FIG. 6 Keeper Assembly: Load at failure—58,000 pounds. Same failure mode as above. This second comparison keeper assembly had a larger or more generous radius at the base edges of the pin groove and larger inner peripheral edge chamfers on the keeper as is illustrated.
3. Test of FIG. 2 Keeper Assembly of the present invention: Load at failure—87,500 pounds. Basically, the failure mode of the keeper assembly 10 was similar to the tests of FIGS. 5 and 6 above, only differing by having a less brittle failure of the pin and the advantageous formation of an annular ridge over which the keeper segments 46 had to move.
4. Test of FIG. 7 Keeper Assembly: Load at failure—157,000 pounds. This third comparison keeper assembly also had a conical shear failure at the end of the pin, only a more muffled or extended failure when compared to the other keeper assemblies. Moreover, upon failure it had a formation of a still larger annular ridge over which any keeper segment would have to move. Specifically, the shear failure cone was larger and eminated from a point about half-way up the concave side of the groove as indicated by the phantom line in FIG. 7.

Figure 5:
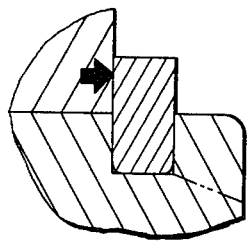
FIG. 5 is a diagrammatic, fragmentary cross sectional view of a first comparison keeper assembly of the usual type.
Figure 6:
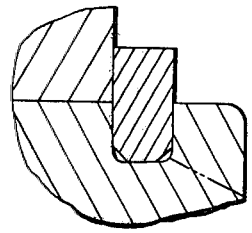
FIG. 6 is a view similar to FIG. 5, only showing a second comparison keeper assembly.
Figure 7:
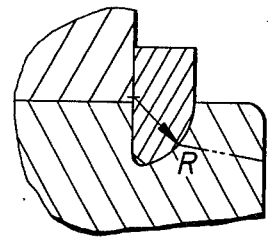
FIG. 7 is a view similar to FIGS. 5 and 6, only showing a third comparison keeper assembly.

In summary, the load to failure capability of the keeper assembly 10 is a marked improvement over the first and second comparison keeper assemblies of FIGS. 5 and 6, but is not as good as the third comparison keeper assembly of FIG. 7. However, there are two disadvantages of the FIG. 7 keeper assembly construction. The first is that the keeper segments could be inadvertently installed backwards in the groove since the cross section thereof is unsymmetrical. The second is that the keeper segments and the groove are more difficult and costly to manufacture because the cross sections are in part half semicircles. While having a lower load to failure capability, the keeper assembly 10 of the present invention has neither of these shortcomings, making such construction very desirable.

Alternate Embodiment

Figure 4:
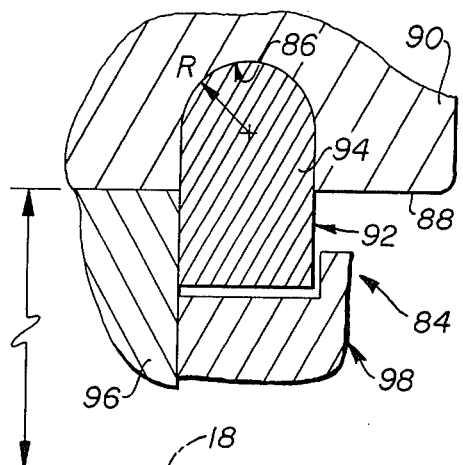
FIG. 4 is a fragmentary cross sectional view of an alternate embodiment keeper assembly constructed in accordance with the present invention, which may be compared with FIG. 2.

An alternate embodiment keeper assembly 84, constructed in accordance with the present invention, is shown in FIG. 4. It differs from the FIG. 1–3 embodiment only in that the geometry of the various elements is reversed relative to the central axis 18 thereof. Specifically, the keeper assembly 84 has groove means 86 opening radially inwardly upon an internal cylindrical surface 88 of an outer member 90, and keeper means 92 including one or more keeper segments 94 capable of transmitting force from an inner member 96 radially away from the central axis and obliquely outwardly into the end of the outer member. It is clear from FIG. 4, that the U-shaped keeper means and groove means are merely the reverse of that described above. Furthermore, the retaining means 98 differs only in that it is releasably attached to the inner member 96 and prevents the individual keeper segments 94 from moving radially inwardly out of the groove means.

Other aspects, objects and advantages will become apparent from a study of the specification, drawings and appended claims.

We claim:

1. In a keeper assembly (10) of the type including a first member (16) having a central axis (18) and an annular groove (64), and a second member (32) having a force transmitting surface (76) located in a plane transverse to the axis (18), the improvement comprising:

said groove (64) having a pair of planar side walls (66,68) and a concave root (70) defining a preselected U-shaped configuration in cross section as taken by a cutting plane through the axis (18); and a plurality of similar arcuate keeper segments (46), each keeper segment (46) having a pair of planar side surfaces (56,68) and a convex curved surface (60) defining a preselected U-shaped configuration in cross section generally corresponding to the cross section of said groove (64), each keeper segment (46) being seated in said groove (64) and in use transferring force from the surface (76) of the second member (32) into the first member (16), and each keeper segment (46) having a radially outer cylindrical surface portion (50) having opposite edges (52,54), each of said planar side surfaces (56,68) being connected to one of said edges (52,54).

2. The keeper assembly (10) of claim 1 including a retaining cap (80) releasably connected to said second member (32) and limiting outward movement of said keeper segments (46) from said groove (64).

3. In a keeper assembly (10) for transferring forces from a track link (32) to a track pin (16) of an endless track chain joint (14), the track pin (16) having a central axis (18) and defining an annular groove (64), and the track link (32) defining a counterbore (74) having a force transmitting surface (76) transverse to said axis (18), the improvement comprising:

said groove (64) having a pair of planar and parallel side walls (66,68) and a connecting concave root (70) in cross section;

a plurality of similar arcuate keeper segments (46), each keeper segment (46) having a pair of planar side surfaces (56,58) and a convex curved surface (60) defining a U-shaped cross section corresponding to the cross section of said groove (64), each keeper segment (46) being seated in said groove (64) and disposed generally within said counterbore (74) of said track link (32) and in use transferring force from said surface (76) of said track track link (32) into said track pin (16); and retaining means (44) receivable in said counterbore (74) for radially containing said keeper segments (46) and axially protecting the planar side surfaces (58) of said keeper segments that are adjacent the open end of said counterbore (74) (46).

4. The keeper assembly (10) of claim 3 wherein each of said keeper segments (46) has a radially outer cylindrical surface portion (50) and said retaining means (44) includes a cap (80) defining a counterbore (82) closely entrapping said outer cylindrical surface portions (50) of said keeper segments (46).

* * * * *